US006298052B1

(12) United States Patent
Bousquet et al.

(10) Patent No.: US 6,298,052 B1
(45) Date of Patent: Oct. 2, 2001

(54) COMMUNICATION METHOD USED IN A SHARED RESOURCE TRANSMISSION SYSTEM

(75) Inventors: Jacques Bousquet, Croissy sur Seine; Jean-Pierre Dehaene, Cormeilles en Parisis, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/033,702

(22) Filed: Mar. 3, 1998

(30) Foreign Application Priority Data

Mar. 3, 1997 (FR) .................................................. 97 02491

(51) Int. Cl.$^7$ .................................................. H04L 12/16
(52) U.S. Cl. ............................................ 370/349; 375/267
(58) Field of Search ...................................... 375/267, 299, 375/347, 138; 370/319–321, 344, 347, 349, 440, 441, 474, 395; 714/822

(56) References Cited

U.S. PATENT DOCUMENTS

| | | | |
|---|---|---|---|
| 3,906,445 | * 9/1975 | Beckmann et al. | 714/822 |
| 4,133,504 | * 1/1979 | Dobler et al. | 714/822 |
| 4,400,811 | * 8/1983 | Brown et al. | 714/822 |
| 4,518,947 | * 5/1985 | Poston et al. | 375/267 |
| 4,621,368 | * 11/1986 | Onoe et al. | 375/267 |
| 4,841,527 | 6/1989 | Raychaudhuri et al. . | |
| 4,908,828 | * 3/1990 | Tikalsky | 714/822 |
| 5,034,966 | * 7/1991 | Hochstein | 375/267 |
| 5,109,390 | * 4/1992 | Gilhousen et al. | 375/267 |
| 5,138,631 | 8/1992 | Taylor . | |
| 5,142,533 | 8/1992 | Crisler et al. . | |
| 5,168,510 | * 12/1982 | Hill | 375/267 |
| 5,457,678 | * 10/1995 | Goeldner | 370/395 |
| 5,663,990 | * 9/1997 | Bolgiano et al. | 375/138 |
| 5,883,581 | * 3/1999 | Dorenbosch et al. | 375/267 |

FOREIGN PATENT DOCUMENTS

| | | | |
|---|---|---|---|
| 2029170 | * 3/1980 | (GB) | 714/822 |
| 61 043850 | 3/1986 | (JP) . | |
| 62 131636 | 6/1987 | (JP) . | |
| 08 032596 | 2/1996 | (JP) . | |

* cited by examiner

Primary Examiner—Salvatore Cangialosi
(74) Attorney, Agent, or Firm—Sughrue, Mion, Zinn, Macpeak & Seas, PLLC

(57) ABSTRACT

The invention concerns a method of communication used in a shared resource transmission system. In accordance with the invention it consists in sending at least two identical data packets without waiting for an acknowledgement of reception between sending said data packets.

The invention can reduce call set-up time compared to the prior art and applies in particular to satellite transmission.

8 Claims, 1 Drawing Sheet

COMMUNICATION METHOD USED IN A SHARED RESOURCE TRANSMISSION SYSTEM

The field of the invention is that of transmitting data in a shared resource transmission system. To be more precise, the present invention concerns an ALOHA type shared resource transmission system that can be used to set up transmission between a calling station and a called station, for example via satellite. In the case of transmission via satellite the stations are typically earth stations.

Consider first the context of transmitting data in packets via a shared resource for setting up a call between a calling station and a called station. Call set-up is a phase preceding communication proper and its function is to allocate a resource reserved to the call in question.

The random ALOHA access system is used prior to call set-up. This system entails a calling station sending a data packet called the access packet for the attention of a called station using for this purpose a resource shared with other stations. The shared resource is typically a carrier frequency. The various stations share the resource without any prior reservation of time slots and without any temporal synchronization of the stations. Because there is no reservation, collisions can occur between access packets sent by different stations. To compensate this risk of collision a station sending a first access packet that does not receive any acknowledgement message from the called station sends a second access packet via the shared resource after a particular time-delay starting from sending the first access packet.

Assuming that there is no correlation between the sending of access packets by the various stations, in other words that the sending of the packets obeys Poisson's law, the probability P of a collision between access packets occurring is equal to:

$$P = 1 - e^{-2RT}$$

where R is the average number of packets transmitted per second and T is the duration of a packet. The digit 2 indicates that a collision occurs if two packets of duration T are transmitted within a time window of duration 2T.

To overcome this drawback it has been decided to provide time windows of duration T during which stations are authorized to send access packets. In this case the various stations are temporally synchronized. This system is known as the slotted ALOHA system. In this case the probability P of a collision between access packets occurring is equal to:

$$P = 1 - e^{-2RT}$$

Accordingly, the number r of access packets transmitted without repetition is generally written:

$$r = R^* e^{-kRT}$$

with k=1 for the slotted ALOHA system and k=2 for the random ALOHA system.

The main drawback of these two types of access system is the high number of repetitions of access packets, which commensurately increases call set-up time. This problem is serious in the case of transmission via satellite because of the distance traveled by the access packets between the sending station and the station to which the access packets are addressed.

Packets of data can also be transmitted using ALOHA systems, slotted or otherwise. In this case the packets are not access packets but packets of data as such used for the call between the calling station and the called station. The data packets convey alarm, supervisory, etc data. The same problem arises for these data packets as that which has previously arisen for access packets.

One aim of the present invention is to solve these problems.

To be more precise, one aim of the invention is to reduce the number of collisions between data packets transmitted by a station in a system where the senders of such packets use the same resource.

This aim and others that will become apparent hereinafter are achieved by a method of communication used in a shared resource transmission system characterized in that it consists in sending at least two identical data packets without waiting for an acknowledgement of reception between sending said data packets.

The above method is advantageously used to set up a call and in this case the aforementioned data packets are access packets.

The above method is advantageously employed in a satellite transmission system either for call set-up or for communication proper.

The data packets preferably each include data for detecting a collision between the data packets transmitted on the shared resource.

The packets can be transmitted with a temporal spacing and/or on different carrier frequencies and/or using code-division multiple access (CDMA).

The invention applies to a slotted or otherwise ALOHA type shared resource transmission system.

Other features and advantages of the invention will become apparent from a reading of the following description of one preferred embodiment given by way of non-limiting illustration and from the appended drawings in which.

The following description concerns a transmission system in which the data packets transmitted via the shared resource are access packets for setting up a call between a calling station and a called station.

To limit call set-up time and therefore the probability of collision of access packets transmitted by a station the invention proposes that each station requiring to set up a call should transmit at least two access packets without waiting for an acknowledgement between sending the access packets. To be more precise, the invention proposes to send the same access packet n times (n>1) in a given time period whether an acknowledgement message is received from the station to which these packets are sent or not.

The transmission is done within a time period less than that required for a round trip of a packet between the calling station and the called station.

The probability that the called station has not received the transmitted message is equal to the probability that all the packets transmitted have collided with other packets. This probability is written:

$$P_n = p^n = (1 - e^{-kRT})^n$$

The total number R of packets transmitted via the shared resource is therefore equal to the sum of the n*r original packets and the R/n messages repeated with the probability $P_n$, that is:

$$R = n*r + R*P_n \text{ or } r = \frac{R}{n}*[1-(1-e^{kRT})^n]$$

Figure 1:
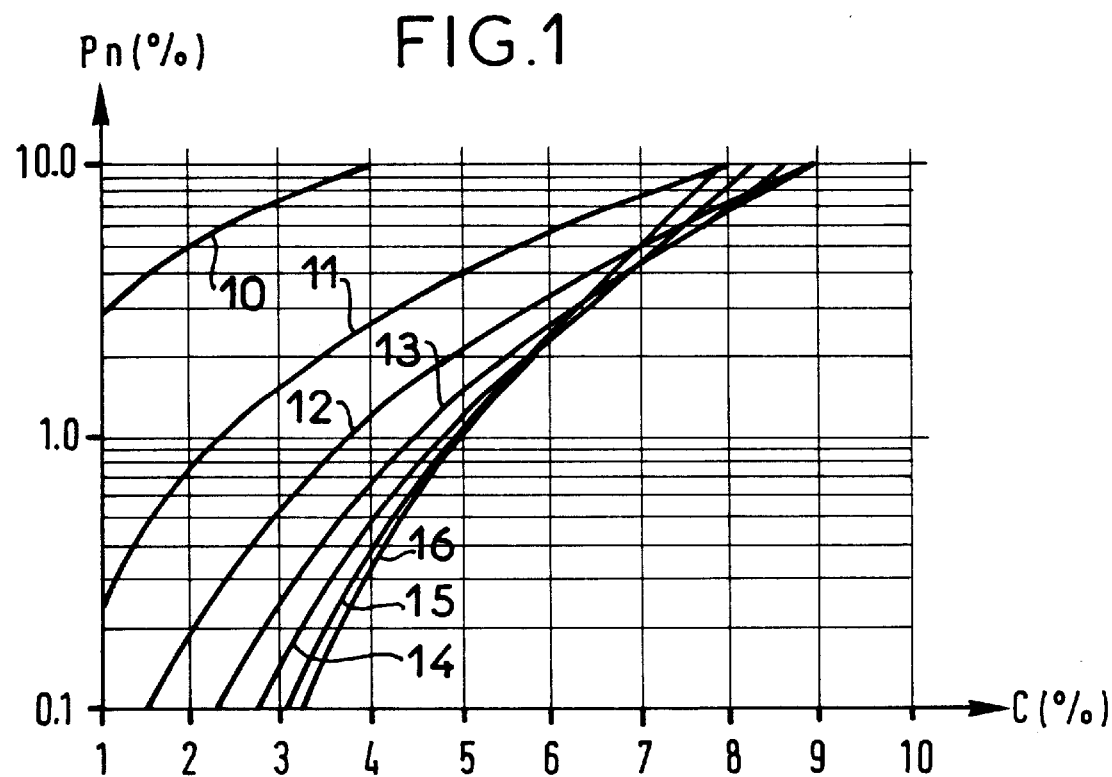
FIG. 1 shows the probability of collision between data packets as a function of the load on the temporally shared resource for n=1 through 7 where n is the number of times the same data packet is sent during a predetermined time period for a random ALOHA access system.

The effect of the invention can be seen in FIG. 1 which shows the probability of collision between access packets as a function of the load on the temporally shared resource for n=1 through 7 where n is the number of times the same access package is sent during a predetermined time period for a random ALOHA access system. Here the packet error rate is 1%.

The characteristic 10 corresponds to the prior art (n=1), i.e. for a 4% load C on the shared resource a single access packet transmitted has a 10% probability of colliding with another packet. In this case it will be necessary to send the packet again.

Characteristics 11 through 16 respectively correspond to transmission of n=2 through n=7 access packets in a given time period without waiting for an acknowledgement from the destination station. For n=2 and for the same 4% load C on the shared resource the probability $P_n$ that the destination station has not received any of these packets correctly drops to around 2.5%, that is four times less than for n=1. The higher the value of n the greater the probability that at least one packet transmitted will be received correctly by the destination station. Note however that this process has limitations when the load C is high: in this case, the higher the number n of access packets transmitted the greater the risk of collisions.

The invention is of increased benefit if the sending stations are temporally synchronized. The packets are then transmitted in accordance with the slotted ALOHA system.

Figure 2:
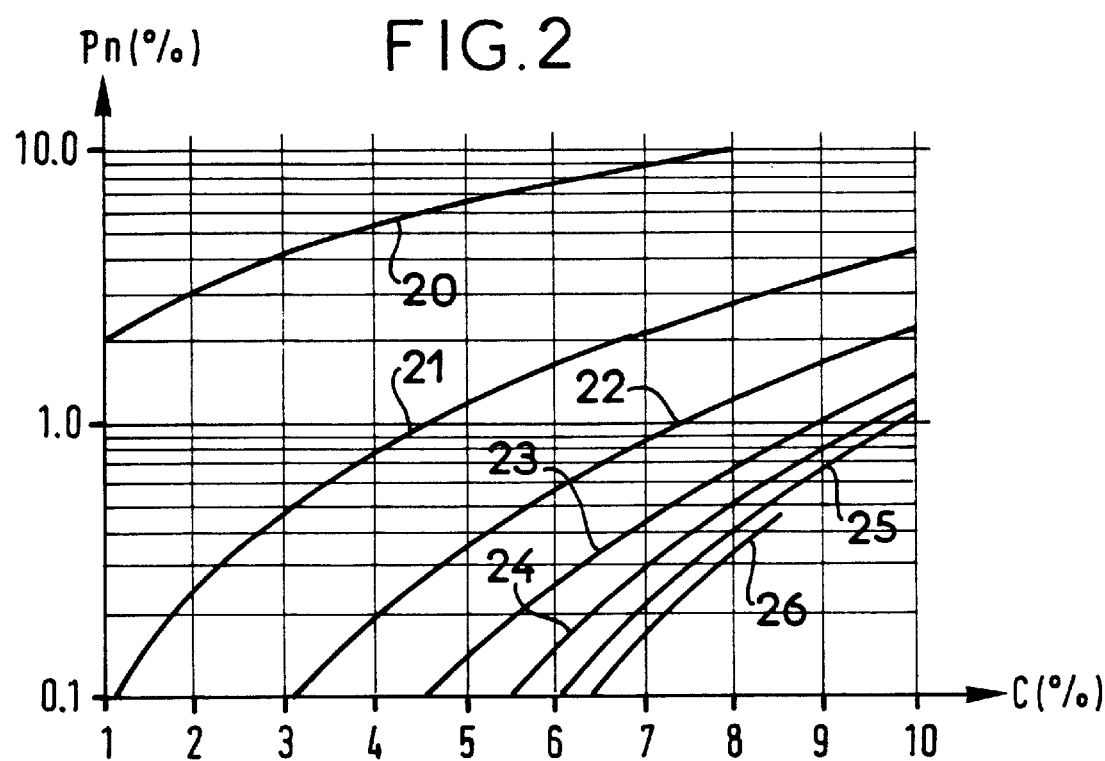
FIG. 2 shows the probability of collision between data packets as a function of the load on the temporally shared resource for n=1 through 7 where n is the number of times the same data packet is sent during a predetermined time period for a slotted ALOHA access system.

FIG. 2 shows the probability of collision between data packets as a function of the load on the temporally shared resource for n=1 through 7 where n is the number of times the same data packet is sent during a predetermined time period for a slotted ALOHA access system. Here the packet error rate is also 1%.

The characteristic 20 corresponds to the prior art (n=1), that is to say for an 8% load C on the shared resource a single access packet transmitted has a 10% probability of colliding with another packet.

Characteristics 21 through 26 respectively correspond to transmission of n=2 through n=7 access packets in a given time period without waiting for an acknowledgement from the destination station. It can be seen that for n=7 and for the same 8% load C on the shared resource the probability $P_n$ that the destination station has not received any of these packets correctly drops to 0.3%. The phenomenon seen in FIG. 1 is no longer seen in FIG. 2 as it occurs for a load C greater than 10%.

The systematic repetition of the access packets in the predefined time period therefore increases the probability that at least one of these packets will reach the destination station, which reduces the time necessary to set up a call.

The n packets transmitted can be transmitted on the same carrier frequency and spaced in time, preferably at random. Another solution is to transmit these packets on different carrier frequencies, possibly in combination with a temporal distribution. Other implementations are possible, for example CDMA mode transmission in which the packets transmitted are by access codes, for example Walsh sequences.

The invention is particularly beneficial when it is applied to call set-up via satellite. In this case the probability of having to retransmit one or more access packets is much lower than in the prior art and it is not necessary to wait to confirm non-reception of a message acknowledging reception before retransmitting. For a satellite link the time saving is that required for the radio signal to perform a round trip between the stations that are to enter into communication, i.e. approximately 0.6 seconds for a geostationary orbit satellite.

The invention applies equally to transmission systems in which access by sending stations, for example mobiles, to one or more destination stations, for example fixed stations, is in accordance with the ALOHA system as described above.

The access packets transmitted advantageously each include a cyclic redundancy check (CRC) code or other data for detecting whether there has been a collision between the packets transmitted.

The aim of the CRC is to detect transmission errors. It therefore enables the addressee to determine if the message has been transmitted correctly. If n messages are sent simultaneously it indicates that at least one message has been transmitted correctly. Moreover, if the n messages were to arrive with different field values, it enables the receiver to tell which of the messages are good. It therefore provides additional security in terms of channel quality (not just in terms of collisions).

Of course, the invention is not limited to call set-up and is equally directed to the sending of data packets (information packets) during a call between two stations.

What is claimed is:

1. A method of setting up a call between a calling station and a called station in a shared resource transmission system, the method comprising sending from said calling station to said called station at least two identical access data packets within a predetermined time period without waiting for an acknowledgement of reception between sending said access data packets, wherein said predetermined time period is less than a time period required for a round trip of a packet between the calling station and the called station.

2. A method according to claim 1, wherein said shared resource transmission system is a satellite transmission system.

3. A method according to claim 1, wherein said access data packets each include data for detecting collision between data packets transmitted over said shared resource.

4. A method according to claim 1, wherein said access data packets are transmitted spaced in time.

5. A method according to claim 1, wherein said data packets are transmitted on different carrier frequencies.

6. A method according to claim 1, wherein said access data packets are transmitted by code-division multiple access.

7. A method according to claim 1, wherein said shared resource transmission system is a non-slotted ALOHA shared resource transmission system.

8. A method according to claim 1, wherein said shared resource transmission system is a slotted ALOHA shared resource transmission system.

* * * * *